United States Patent
Ikarashi et al.

(10) Patent No.: US 8,168,889 B2
(45) Date of Patent: May 1, 2012

(54) THERMOSETTING CONDUCTIVE PASTE AND MULTILAYER CERAMIC PART HAVING AN EXTERNAL ELECTRODE FORMED USING THE SAME

(75) Inventors: Senichi Ikarashi, Niigata (JP); Kiminori Yokoyama, Niigata (JP)

(73) Assignee: Namics Corporation, Niigata-shi, Niigata (JP)

( * ) Notice: Subject to any disclaimer, the term of this patent is extended or adjusted under 35 U.S.C. 154(b) by 876 days.

(21) Appl. No.: 12/086,622

(22) PCT Filed: Dec. 21, 2006

(86) PCT No.: PCT/JP2006/325462
§ 371 (c)(1),
(2), (4) Date: Jun. 19, 2008

(87) PCT Pub. No.: WO2007/072894
PCT Pub. Date: Jun. 28, 2007

(65) Prior Publication Data
US 2009/0139754 A1    Jun. 4, 2009

(30) Foreign Application Priority Data

Dec. 22, 2005 (JP) ................................. 2005-370460
Dec. 22, 2005 (JP) ................................. 2005-370965

(51) Int. Cl.
*H05K 1/09* (2006.01)
*H01G 4/228* (2006.01)
(52) U.S. Cl. ..................................... 174/257; 361/306.3
(58) Field of Classification Search .................. 174/257; 36/305
See application file for complete search history.

(56) References Cited

U.S. PATENT DOCUMENTS 7,022,266 B1 * 4/2006 Craig ........................... 252/512
2006/0044098 A1 * 3/2006 Kimura et al. ................. 336/122

FOREIGN PATENT DOCUMENTS

| JP | 06-267784 A | 9/1994 |
| JP | 08-023170 A | 1/1996 |
| JP | 09-129479 A | 5/1997 |
| JP | 10-154417 A | 6/1998 |
| JP | 11-307930 A | 11/1999 |
| JP | 2000-182883 A | 6/2000 |
| JP | 2001-122639 A | 5/2001 |
| JP | 2002-208535 A | 7/2002 |
| JP | 2004-047419 A | 2/2004 |
| WO | WO 2004/053901 A1 | 6/2004 |

OTHER PUBLICATIONS

English language Written Opinion of the International Searching Authority (4 pages) for PCT/JP2006/325462.
English language International Preliminary Report on Patentability (1 page) for PCT/JP2006/325462.

* cited by examiner

*Primary Examiner* — Timothy Thompson
*Assistant Examiner* — Roshn Varghese
(74) *Attorney, Agent, or Firm* — Holtz, Holtz, Goodman & Chick, PC

(57) ABSTRACT

Disclosed is a thermosetting conductive paste which is advantageous in that an external electrode for multilayer ceramic electronic part formed using the paste exhibits excellent bonding properties with an internal electrode and is suitable for mounting on a substrate or plating, achieving excellent electric properties (electrostatic capacity, tan δ. A thermosetting conductive paste comprising: (A) metal powder having a melting point of 700° C. or higher; (B) metal powder having a melting point of higher than 300 to lower than 700° C.; and (C) a thermosetting resin.

14 Claims, 1 Drawing Sheet

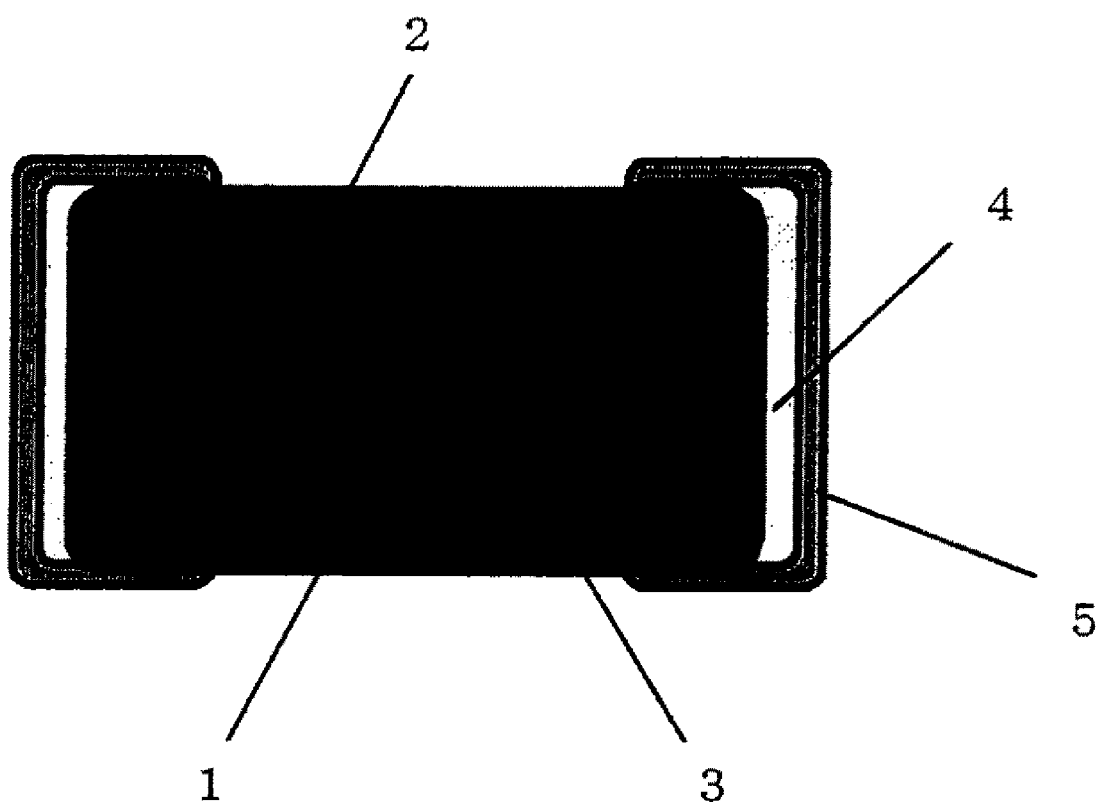
PRIOR ART

THERMOSETTING CONDUCTIVE PASTE AND MULTILAYER CERAMIC PART HAVING AN EXTERNAL ELECTRODE FORMED USING THE SAME

This application is the United States national phase application of International Application PCT/JP2006/325462 filed Dec. 21, 2006.

FIELD OF THE INVENTION

The present invention relates to a thermosetting conductive paste and a multilayer ceramic electronic part having an external electrode formed using the same. More particularly, the present invention is concerned with a thermosetting conductive paste which is advantageous in that an external electrode suitable for mounting on a substrate or plating can be formed using the paste, and a multilayer ceramic electronic part, e.g., a multilayer ceramic capacitor, having an external electrode formed using the thermosetting conductive paste.

BACKGROUND ART

Stacked ceramic capacitor 1, which is an example of a multilayer ceramic electronic part, is shown in FIG. 1. External electrode 4 of multilayer ceramic capacitor 1 is generally formed using a calcination type conductive paste or a thermosetting conductive paste by the following method.

The first method is a method in which a calcination type conductive paste prepared by mixing, for example, conductive particles, such as Ag powder or Cu powder, and glass frit into a vehicle is applied to the leading side for internal electrode 3 of a multilayer ceramic composite material, and dried and then calcined at a high temperature of 500 to 900° C. to form external electrode 4.

The second method is a method in which a thermosetting conductive paste prepared by mixing conductive particles, such as Ag powder, into a thermosetting resin is applied to the leading side for internal electrode 3 of a multilayer ceramic composite material, and then thermally cured at a low temperature of 150 to 250° C. to form external electrode 4 (see, for example, patent document 1).

The third method is a method in which a thermosetting conductive paste prepared by mixing a heat decomposable organometal compound, such as silver acetate, and conductive particles, such as Ag powder, into a thermosetting resin is applied to the leading side for internal electrode 3 of a multilayer ceramic composite material, and then thermally cured at 350° C. to form external electrode 4 (see, for example, patent document 2).

The fourth method is a method in which a thermosetting conductive paste comprising a thermosetting resin, high melting-point conductive particles, and metal powder having a melting point of 300° C. or lower is applied to the leading side for internal electrode 3 of a multilayer ceramic composite material, and then thermally cured at a low temperature of 80 to 400° C. to form external electrode 4 (see, for example, patent document 3).

In any methods, for improving the bonding strength of the resultant capacitor device when mounted on, e.g., a substrate by soldering, the surface of the electrode layer is optionally plated 5. For example, the surface of the external electrode is plated with Ni by electroplating in, e.g., a Watts bath, and then further subjected to solder plating or Sn plating by electroplating.

However, in the capacitor having an external electrode obtained by the first method, the glass frit component of the conductive paste diffuses into the capacitor device during the high-temperature calcination, and therefore a problem occurs in that, e.g., cracks are caused when mounting the capacitor on a substrate by soldering. Further, the plating solution penetrates the sintered material during the plating, so that the designed electrostatic capacity cannot be obtained or deterioration of the insulation resistance occurs, leading to a problem of the reliability of capacitor performance.

On the other hand, the capacitor having an external electrode obtained by the second method is free of the above problems caused when mounting the capacitor on a substrate or in plating. However, the curing temperature for the paste is low, and solid phase diffusion does not proceed between metals, i.e., the conductive particles, e.g., Ag powder contained in the conductive paste and the internal electrode, and hence the internal and external electrodes are not satisfactorily bonded together, so that desired electric properties including the designed electrostatic capacity cannot be obtained and the reliability is poor.

The capacitor having an external electrode obtained by the third method has disadvantages in that the silver acetate and amine contained in the paste causes the pot life of the paste to be shortened and deterioration of insulation occurs due to humidity aging.

Further, in the capacitor having an external electrode obtained by the fourth method, the solder reflow temperature in mounting of an electronic part on a substrate is increased for achieving lead free soldering due to the recent lead problems, and the increase of the temperature possibly melts again the low melting-point metal powder to cause the solder to burst.

Patent document 1: Japanese Unexamined Patent Publication No. Hei 6-267784
Patent document 2: Japanese Unexamined Patent Publication No. 2000-182883
Patent document 3: International Publication No. 2004/053901

DISCLOSURE OF THE INVENTION

Problems to be Solved by the Invention

An object of the present invention is to solve the above problems accompanying the formation of an external electrode and the subsequent plating in the prior art technique. Specifically, it is an object to solve the above problems of the bonding between internal and external electrodes caused due to the thermosetting conductive paste, and to provide a thermosetting conductive paste which is advantageous in that an external electrode formed using the paste exhibits excellent electric properties (electrostatic capacity, tan δ) and is suitable for mounting on a substrate or plating, and a multilayer ceramic electronic part having an external electrode formed using the thermosetting conductive paste.

Means to Solve the Problems

The present invention is directed to a multilayer ceramic electronic part having an external electrode formed using a thermosetting conductive paste which comprises: (A) metal powder having a melting point of 700° C. or higher; (B) metal powder having a melting point of higher than 300 to lower than 700° C.; and (C) a thermosetting resin.

Effect of the Invention

By using the thermosetting conductive paste of the present invention, there is provided an external electrode for multilayer ceramic electronic part, which has excellent bonding properties with an internal electrode and which is suitable for mounting on a substrate or plating, achieving excellent electric properties (electrostatic capacity, tan δ). In the present invention, in addition to metal powder having a melting point of 700° C. or higher corresponding to the conductive particles conventionally used, metal powder having a melting point of higher than 300° C. to lower than 700° C. is used in the thermosetting conductive paste. Therefore, it is presumed that solid phase diffusion proceeds between the metal powder contained in the conductive paste and the internal electrode, thus obtaining excellent bonding between internal and external electrodes and excellent electric properties.

BRIEF DESCRIPTION OF THE DRAWING

FIG. 1 is a diagrammatic view of a multilayer ceramic capacitor, which is an example of a multilayer ceramic electronic part.

| Description of Reference Numerals | |
|---|---|
| 1 | Stacked ceramic capacitor |
| 2 | Ceramic dielectric |
| 3 | Internal electrode layer |
| 4 | External electrode layer |
| 5 | Plated layer |

BEST MODE FOR CARRYING OUT THE INVENTION

The thermosetting conductive paste of the present invention comprises: (A) metal powder having a melting point of 700° C. or higher; (B) metal powder having a melting point of higher than 300 to lower than 700° C.; and (C) a thermosetting resin.

Component (A) is metal powder having a melting point of 700° C. or higher. Metal powder can be used individually or two or more types of metal powder can be used in combination. The metal powder preferably has a melting point of 800° C. or higher.

Specific examples include powder of a metal having a melting point of 700° C. or higher, e.g., Ag, Cu, Ni, Pd, Au or Pt. Further, examples include metal powder having a melting point of 700° C. or higher, comprised of an alloy of Ag, Cu, Ni, Pd, Au and/or Pt. Specifically, metal powder comprised of an alloy of two elements or more selected from the group consisting of Ag, Cu, Ni, Pd, Au and Pt can be used. Examples of binary alloys include Ag—Cu alloys, Ag—Au alloys, Ag—Pd alloys and Ag—Ni alloys, and examples of tertiary alloys include Ag—Pd—Cu alloys and Ag—Cu—Ni alloys. There can be used metal powder comprised of an alloy of at least one element selected from Ag, Cu, Ni, Pd, Au and Pt and other at least one element wherein the alloy has a melting point of 700° C. or higher. Examples of other elements include Zn and Al.

From the viewpoint of relatively easily obtaining excellent conductivity, preferred is metal powder comprised of Cu, Ni, Ag or an Ag alloy, and especially preferred is metal powder comprised of Ag or an Ag alloy. Examples of Ag alloys include Ag—Cu alloys, Ag—Au alloys, Ag—Pd alloys and Ag—Ni alloys.

The metal powder may be in any form, for example, spherical or in a flake or needle-like form. The metal powder preferably has an average particle size of 0.04 to 30 μm, more preferably 0.05 to 20 μm from the viewpoint of obtaining excellent surface state after the printing or application of the paste and excellent conductivity of the electrode formed. From the viewpoint of achieving excellent printing or application of the paste, spherical silver particles and flake silver particles are preferably used in combination. In the present specification, the average particle size means an average particle size with respect to the spherical metal powder, an average major size of particle flakes with respect to the flake metal powder, and an average length with respect to the needle-like metal powder.

Particularly, from the viewpoint of obtaining stable electric properties, with respect to the metal powder, it is preferred to use Ag fine powder having the following characteristics: (a) an average particle size of 40 to 100 nm, preferably 50 to 80 nm, in respect of primary particles; (b) a crystallite size of 20 to 70 nm, preferably 20 to 50 nm; and (c) a ratio of the average particle size to the crystallite size of 1 to 5, preferably 1 to 4. A crystallite size is obtained by a method in which a value of a half width of the peak is determined wherein the peak is ascribed to the (1,1,1) crystal face diffraction as measured by powder X-ray diffractometry under conditions such that the radiation source is CuKα and the obtained value of the half width is applied to the Scherrer's equation.

The Ag fine powder can be obtained by mixing a silver salt of carboxylic acid and an aliphatic primary amine with each other in the presence of or in the absence of an organic solvent, and then adding a reducing agent to the resultant mixture to effect a reaction at a reaction temperature of 20 to 80° C., causing precipitation of Ag fine powder.

With respect to the silver salt of carboxylic acid, there is no particular limitation, but preferred is a silver salt of aliphatic monocarboxylic acid, and more preferred is silver acetate, silver propionate or silver butyrate. These can be used individually or in combination.

With respect to the aliphatic primary amine, there is no particular limitation, and it may be either a chain aliphatic primary amine or a cyclic aliphatic primary amine. Preferred is 3-methoxypropylamine, 3-aminopropanol or 1,2-diaminocyclohexane. These can be used individually or in combination.

The amount of the aliphatic primary amine used is preferably 1 equivalent or more relative to 1 equivalent of the silver salt of carboxylic acid, and, from the viewpoint of preventing adverse effects on the environment due to the use of excess aliphatic primary amine, the amount of the aliphatic primary amine used is preferably 1.0 to 3.0 equivalent, more preferably 1.0 to 1.5 equivalent, especially preferably 1.0 to 1.1 equivalent.

Mixing the silver salt of carboxylic acid and aliphatic primary amine can be conducted in the absence of or in the presence of an organic solvent, and examples of organic solvents include alcohols, such as ethanol, propanol and butanol, ethers, such as propylene glycol dibutyl ether, and aromatic hydrocarbons, such as toluene. These can be used individually or in combination. The amount of the organic solvent used can be arbitrarily selected depending on the desired mixing efficiency or productivity of the Ag fine powder in the subsequent steps.

Mixing the silver salt of carboxylic acid and aliphatic primary amine is conducted while maintaining the temperature preferably at 20 to 80° C., more preferably at 20 to 60° C.

With respect to the reducing agent, from the viewpoint of controlling the reaction, preferred is formic acid, formaldehyde, ascorbic acid or hydrazine, and more preferred is formic acid. These can be used individually or in combination.

The amount of the reducing agent used is generally an oxidation-reduction equivalent or more relative to the silver salt of carboxylic acid, and the oxidation-reduction equivalent is preferably 0.5 to 5 times, more preferably 1 to 3 times. When the silver salt of carboxylic acid is a silver salt of monocarboxylic acid and formic acid is used as a reducing agent, the amount of the formic acid used in terms of mole is preferably 0.5 to 1.5 mol, more preferably 0.5 to 1.0 mol, further preferably 0.5 to 0.75 mol, relative to 1 mol of the silver salt of carboxylic acid.

In the addition of a reducing agent and the subsequent reaction, the temperature is maintained at 20° C. to 80° C., preferably at 20 to 70° C., more preferably at 20 to 60° C.

The Ag fine powder formed by precipitation in the reaction can be separated by removing the supernatant by, e.g., decantation or adding a solvent, such as alcohol, e.g., methanol, ethanol or terpineol. The layer containing the Ag fine powder can be directly used as a thermosetting conductive paste.

Component (B) is metal powder having a melting point of higher than 300° C. to lower than 700° C. Component (B) contributes to bonding with an internal electrode when the thermosetting conductive paste is used to form an external electrode for multilayer ceramic. Metal powder can be used individually or two or more types of metal powder can be used in combination.

With respect to component (B), metal powder having a melting point of higher than 300° C. to lower than 400° C. can be used, and, for example, metal powder having a melting point of higher than 300° C. to lower than 390° C. can be used. Specific examples include metal powder having a melting point of higher than 300° C. to lower than 400° C., comprised of an alloy of Sn, In or Bi. Sn, In or Bi is a metal having a melting point of lower than 300° C., and therefore the other element constituting the alloy is a high melting-point metal, for example, at least one member selected from Ag, Cu, Ni, Zn, Al, Pd, Au and Pt, and examples of the metal powder include metal powder comprised of an alloy of at least one element selected from Sn, In and Bi and at least one element selected from Ag, Cu, Ni, Zn, Al, Pd, Au and Pt. Specific examples include metal powder having a melting point of higher than 300° C. to lower than 400° C., comprised of a binary alloy, such as an Sn—Zn alloy, an Sn—Ag alloy, an Sn—Cu alloy, an Sn—Al alloy, an In—Ag alloy an In—Zn alloy, a Bi—Ag alloy, a Bi—Ni alloy, a Bi—Zn alloy or a Bi—Pb alloy, and metal powder having a melting point of higher than 300° C. to lower than 400° C., comprised of a tertiary alloy, such as an Ag—Cu—Sn alloy, an Ag—Cu—In alloy or an Ag—Bi—Cu alloy.

With respect to component (B), metal powder having a melting point of higher than 400° C. to lower than 700° C. can be used, and, for example, metal powder having a melting point of higher than 400° C. to lower than 660° C. can be used. Specific examples include metal powder having a melting point of higher than 400° C. to lower than 700° C., comprised of an alloy of Sn, In or Bi. Sn, In or Bi is a metal having a melting point of lower than 300° C., and therefore the other element constituting the alloy is a high melting-point metal, for example, at least one member selected from Ag, Cu, Ni, Zn, Al, Pd, Au and Pt, and examples of the metal powder include metal powder comprised of an alloy of at least one element selected from Sn, In and Bi and at least one element selected from Ag, Cu, Ni, Zn, Al, Pd, Au and Pt. Specific examples include metal powder having a melting point of higher than 400° C. to lower than 700° C., comprised of a binary alloy, such as an Sn—Zn alloy an Sn—Ag alloy, an Sn—Cu alloy, an Sn—Al alloy, an In—Ag alloy, an In—Zn alloy, a Bi—Ag alloy, a Bi—Ni alloy, a Bi—Zn alloy or a Bi—Pb alloy, and metal powder having a melting point of higher than 400° C. to lower than 700° C., comprised of a tertiary alloy, such as an Ag—Cu—Sn alloy, an Ag—Cu—In alloy or an Ag—Bi—Cu alloy.

From the viewpoint of achieving excellent bonding with an internal electrode, an alloy containing Sn is preferred, and examples include Sn—Ag alloys having an Sn:Ag weight ratio of 89:11 to 25.5:74.5. It is presumed that, when using such powder, the action of Sn during the curing causes further excellent bonding with an internal electrode.

Examples of metal powder having a melting point of higher than 300° C. to lower than 400° C. include metal powder having an Sn:Ag weight ratio of 89:11 or less to more than 72:28, including metal powder having a ratio of 89:11 to 82:28.

Examples of metal powder having a melting point of higher than 400° C. to lower than 700° C. include metal powder comprised of an Sn—Ag alloy having an Sn:Ag weight ratio of 72:28 to 25.5:74.5. From the viewpoint of achieving excellent bonding properties of the external electrode with an internal electrode, preferred is an Sn—Ag alloy having a ratio of 70:30 to 30:70. In the metal powder having a melting point of higher than 300° C. to lower than 700° C., the weight ratio of the constituent metals of the alloy falls in a certain range according to the constituent metals.

The metal powder may be in any form, for example, spherical or in a flake or needle-like form. The metal powder preferably has an average particle size of 0.05 to 30 μm, more preferably 0.1 to 20 μm from the viewpoint of obtaining excellent surface state after the printing or application of the paste and excellent conductivity of the electrode formed.

The thermosetting resin as component (C) functions as a binder, and preferred is an amino resin, such as an urea resin, a melamine resin or a guanamine resin; a epoxy resin, such as a bisphenol A, bisphenol F, phenolic novolak or alicyclic epoxy resin; an oxetane resin; a phenolic resin, such as a resol, alkyl resol, novolak, alkyl novolak or aralkyl novolak phenolic resin; a silicone-modified organic resin, such as silicone epoxy or silicone polyester; bismaleimide; or a polyimide resin. For example, a BT resin can be used. These resins can be used individually or in combination.

With respect to the resin, it is preferred that a resin in a liquid state at room temperature is used since the amount of the organic solvent used as a diluent can be reduced. Examples of liquid resins include liquid epoxy resins and liquid phenolic resins. A resin, which is compatible with the liquid resin and which is in a solid state or very viscous at room temperature, can be further added in such an amount that the resultant mixture has fluidity. Examples of the resins include epoxy resins, such as high molecular-weight bisphenol A epoxy resins, diglycidylbiphenyl, novolak epoxy resins and tetrabromobisphenol A epoxy resins; resol phenolic resins and novolak phenolic resins.

With respect to the curing system, the epoxy resin may be a self-curing resin, or a curing agent or a curing catalyst, such as an amine, an imidazole, a hydroxide or an onium salt, can be used together with the epoxy resin. Alternatively, an amino resin or a phenolic resin can be used as a curing agent for epoxy resin.

With respect to the epoxy resin used in the thermosetting conductive paste, preferred is one which is cured by a phenolic resin. The phenolic resin may be a phenolic resin precondensate generally used as a curing agent for epoxy resin, and may be either of a resol type or a novolak type, but, for relaxing the stress of the resin being cured to obtain excellent heat cycle resistance, it is preferred that 50% by weight or more of the phenolic resin is comprised of an alkyl resol or alkyl novolak phenolic resin. With respect to the alkyl resol phenolic resin, for obtaining excellent printability, the average molecular weight is preferably 2,000 or more. With respect to the alkyl resol or alkyl novolak phenolic resin, a phenolic resin having an alkyl group having 1 to 18 carbon atoms can be used, and preferred is a phenolic resin having an alkyl group having 2 to 10 carbon atoms, such as ethyl, propyl, butyl, pentyl, hexyl, octyl, nonyl or decyl.

Of these, from the viewpoint of obtaining excellent bonding properties and excellent heat resistance, preferred is a bisphenol epoxy resin or a resol phenolic resin, and especially preferred is a combination of a bisphenol epoxy resin and a resol phenolic resin. When a combination of a bisphenol epoxy resin and a resol phenolic resin is used, the epoxy resin:phenolic resin weight ratio is preferably in the range of from 4:1 to 1:4, further preferably 4:1 to 1:2. Further, a polyfunctional epoxy resin having a number of benzene rings (e.g., a tetrafunctional epoxy resin), a phenolic resin, or a polyimide resin is effective from the viewpoint of obtaining excellent heat resistance.

A thermoplastic resin can be used in such an amount that the effect of the present invention is not sacrificed, together with the thermosetting resin. With respect to the thermoplastic resin, preferred is a polysulfone, polyether sulfone or maleimide resin.

From the viewpoint of achieving excellent printability of the thermosetting conductive paste and achieving excellent conductivity of the resultant external electrode layer, the amount of the sum of components (A) and (B) is preferably 60 to 98% by weight, more preferably 70 to 95% by weight, and the amount of component (C) is preferably 40 to 2% by weight, more preferably 30 to 5% by weight, based on the total weight of component (A), component (B) and component (C).

It is preferred that the component (A):component (B) weight ratio {component (A):component (B)} is 99:0.1 to 30:70.

Particularly, when component (B) is metal powder having a melting point of higher than 300° C. to lower than 400° C., the component (A):component (B) weight ratio {component (A):component (B)} is preferably 99.9:0.1 to 60:40, more preferably 99:1 to 67:43, especially preferably 95:5 to 65:35.

Particularly, when component (B) is metal powder having a melting point of higher than 400° C. to lower than 700° C., the component (A):component (B) weight ratio {component (A):component (B)} is preferably 90:10 to 30:70, more preferably 80:20 to 40:60, especially preferably 75:25 to 45:55.

When component (B) is Sn—Ag alloy powder, the amount of Sn contained in component (B) is preferably 5 to 70% by weight, more preferably 10 to 50% by weight, based on 100% by weight of the sum of component (A) and component (B). When component (B) is Sn—Ag alloy powder, component (A) is preferably Ag powder.

With respect to the thermosetting conductive paste, the viscosity can be appropriately controlled according to the method for printing or application of the paste onto a ceramic composite material for a desired electronic part by selecting the types and amounts of components (A), (B) and (C) and optionally using a diluent. For example, when used in screen printing, the apparent viscosity of the conductive paste at room temperature is preferably 10 to 500 Pa·s, more preferably 15 to 300 Pa·s. With respect to the diluent, an organic solvent is used, and the organic solvent is appropriately selected depending on the type of the resin used, and the amount of the organic solvent used is arbitrarily selected depending on the types and ratio of components (A), (B) and (C) and the method for printing or application of the conductive paste.

Examples of organic solvents include aromatic hydrocarbons, such as toluene, xylene, mesitylene and tetralin; ethers, such as tetrahydrofuran; ketones, such as methyl ethyl ketone, methyl isobutyl ketone, cyclohexanone and isophorone; lactones, such as 2-pyrrolidone and 1-methyl-2-pyrrolidone; ether alcohols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, and propylene glycol derivatives corresponding to them; esters, such as acetic acid esters corresponding to the above ether alcohols; and diesters, such as methyl esters or ethyl esters of a dicarboxylic acid, e.g., malonic acid or succinic acid. The amount of the organic solvent used is arbitrarily selected depending on the types and weight ratio of components (A), (B) and (C) used and the method for printing or application of the conductive paste.

In the thermosetting conductive paste, if necessary, as a dispersing agent, an aluminum chelate compound, such as diisopropoxy(ethylacetoacetato)aluminum; a titanate, such as isopropyltriisostearoyl titanate; an aliphatic polycarboxylic acid ester; an unsaturated fatty acid amine salt; a surfactant, such as sorbitan monooleate; or a polymer compound, such as a polyester amine salt or polyamide, can be used. Further, an inorganic or organic pigment, a silane coupling agent, a leveling agent, a thixotropic agent or a defoamer can be added.

The thermosetting conductive paste can be prepared by uniformly mixing the components by a mixing means, such as a mortar grinder, a marine propeller stirrer, a kneader, a roll mill or a pot mill. With respect to the temperature for preparation, there is no particular limitation, but the thermosetting conductive paste can be prepared, for example, at room temperature or at 20 to 30° C.

Using the thus obtained thermosetting conductive paste, a multilayer ceramic electronic part having an external electrode can be formed in accordance with a known method. For example, the thermosetting conductive paste is printed or applied onto the leading side for internal electrode of a ceramic composite material for multilayer ceramic capacitor by an arbitrary method, such as screen printing, transferring or dip coating. Generally, the paste is printed or applied so that the thickness of the external electrode cured becomes preferably 1 to 300 µm, more preferably 20 to 100 µm. When using an organic solvent, the paste printed or applied is dried at room temperature or by heating. Then, for obtaining an external electrode, the paste can be cured, for example, at 80 to 450° C., specifically at 80 to 400° C. Alternatively, the paste can be dried at 80 to 160° C. and then cured at 200 to 450° C. When component (B) is Sn—Ag alloy powder, for obtaining satisfactory effect of the alloy powder, the curing temperature is preferably 250 to 350° C. The thermosetting conductive paste of the present invention is so convenient that the paste need not be placed in an inert gas atmosphere for curing it.

The curing time can be changed depending on, e.g., the curing temperature, but, from the viewpoint of obtaining excellent workability, the curing time is preferably 1 to 60 minutes. When curing is conducted at 250° C. or lower, the curing time is preferably 20 to 60 minutes from the viewpoint of achieving excellent bonding with an internal electrode. For example, when the resin used in the paste is an epoxy resin using a phenolic resin as a curing agent, the paste can be cured at 200 to 450° C. for 5 to 60 minutes to obtain an external electrode. For preventing the volatile components of the paste from vigorously vaporizing to cause blisters or cracks in the paste film, it is desired that rapid heating (for example, rapidly heating the paste to 300° C. or higher) is avoided.

The ceramic composite material for multilayer ceramic electronic part used in the present invention may be prepared by a known method. In the present invention, the ceramic composite material means a multilayer material obtained by alternately stacking a ceramic layer and an internal electrode layer and calcinating the resultant multilayer structure, or a multilayer material obtained by alternately stacking a resin-ceramic hybrid material and an internal electrode. With respect to the ceramic layer or resin-ceramic hybrid material, there can be used one which has properties for a desired electronic part, for example, dielectric properties for a capacitor, and which is obtained by a known method. With respect to the internal electrode layer, there is no particular limitation, but preferred is one using an inexpensive and easily available base metal, e.g., Ni or Cu in an internal electrode. The multilayer ceramic electronic part of the present invention can be, for example, a capacitor, a capacitor array, a thermistor, a varistor, an inductor, or an LC, CR, LR or LCR composite part.

With respect to the multilayer ceramic electronic part obtained, the surface of the electrode layer is optionally plated to further improve the bonding strength in mounting the part on, e.g., a substrate by soldering. The plating is conducted by a known method, but, from an environmental point of view, Pb-free plating is preferably conducted. For example, the surface of the external electrode is plated with Ni by electroplating in, e.g., a Watts bath, and then further subjected to solder plating or Sn plating by electroplating.

The thus obtained multilayer ceramic electronic part having an external electrode, which is formed using the thermosetting conductive paste of the present invention and which has a surface plated, has excellent bonding properties between internal and external electrodes and excellent electric properties, and is advantageously mounted on, e.g., a circuit board.

EXAMPLES

Hereinbelow, the present invention will be described in more detail with reference to the following Examples and Comparative Examples, which should not be construed as limiting the scope of the present invention.

Preparation of Conductive Paste

Compositions of the conductive pastes used in Examples and Comparative Examples {the numbers in the table are indicated in a unit of part(s) by weight unless otherwise specified} are shown in Table 1 below.

[Table 1]

TABLE 1

| Name of material | Example 1 | Example 2 | Example 3 | Example 4 | Example 5 | Comparative Example 1 | Comparative Example 2 | Comparative Example 3 |
|---|---|---|---|---|---|---|---|---|
| Component (A): | | | | | | | | |
| Spherical Ag powder | 63 | | 63 | 45 | | 63 | 90 | |
| Flake Ag powder | 7 | | 7 | 5 | | 7 | 10 | |
| Ag Fine powder-containing paste (Silver content: 89 wt %) | | 78.7 | | | 78.7 | | | 112.4 |
| Spherical Cu85-Ag alloy powder | | | | | | 30 | | |
| Component (B): | | | | | | | | |
| Spherical Sn80-Ag alloy powder | 30 | 30 | | | 30 | | | |
| Spherical Sn35-Ag alloy powder | | | 30 | 50 | | | | |
| Component (C): | | | | | | | | |
| Epoxy resin A | 6.1 | 6.1 | 6.1 | 6.1 | | 6.1 | 6.1 | |
| Phenolic resin A | 9.1 | 9.1 | 9.1 | 9.1 | | 9.1 | 9.1 | |
| BT Resin (Number average molecular weight: 600) | | | | | 15 | | | 15 |
| Curing catalyst: | | | | | | | | |
| 2-Ethyl-4-methylimidazole | 0.4 | | 0.4 | 0.4 | | 0.4 | 0.4 | |
| 2-Methylimidazole isocyanuric acid addition product | | 0.5 | | | 0.5 | | | 0.5 |
| Solvent: Butyl carbitol | Appropriate amount | Appropriate amount | Appropriate amount | Appropriate amount | Appropriate amount | Appropriate amount | Appropriate amount | Appropriate amount |
| Component (A) weight: component (B) weight | 70:30 | 70:30 | 70:30 | 50:50 | 70:30 | 100:0 | 100:0 | 100:0 |
| Amount of sum of components (A) and (B), based on total weight of components (A), (B), and (C) (wt %) | 87 | 87 | 87 | 87 | 87 | 87 | 87 | 87 |

Component (A) shown in Table 1 is as follows.

Spherical Ag powder A: average particle size: 0.3 μm; purity: 99.5% or higher

Flake Ag powder: average particle size: 12 μm; purity: 99% or higher

Ag Fine powder-containing paste:

A method for preparing an Ag fine powder-containing paste is as follows. 3.0 kg (30.9 mol) of 3-methoxypropylamine was placed in a 10 L reaction vessel made of glass. While stirring and maintaining the reaction temperature at 45° C. or lower, 5.0 kg (30.0 mol) of silver acetate was added to the vessel. Immediately after the start of the addition, the silver acetate was dissolved and the resultant mixture was a transparent solution, but, as the addition proceeded, the solution gradually became cloudy, and, after completion of the addition, a grayish brown cloudy viscous solution was formed. 1.0 kg (21.0 mol) of 95 wt % formic acid was added dropwise slowly to the resultant viscous solution. Immediately after the start of the addition, a vigorous exothermic reaction occurred, but the reaction temperature was maintained at 30 to 45° C. during the reaction. At first, the gray cloudy viscous solution changed in color from brown to black. After completion of the addition of formic acid, the reaction was terminated. The resultant reaction mixture was allowed to stand at 40° C., so that the mixture was separated into two layers. The upper layer was a yellow transparent liquid, and black silver fine particles settled on the bottom of the lower layer. The liquid of the upper layer contained no silver component. The liquid of the upper layer was removed by decantation, and the lower layer was separated using methanol to obtain an Ag fine powder-containing paste having a silver content of 89% by weight.

The Ag fine powder contained in the paste has the following properties: average particle size: 61 nm; crystallite size: 40 nm; average particle size/crystallite size=1.5. An average particle size is a value obtained by a method in which about 0.5 g of an Ag fine powder-containing paste is added to 50 cc of dispersing water (AEROSOL 0.5%-containing water) and dispersed by means of an ultrasonic dispersing mixer for 5 minutes and the resultant sample is subjected to measurement by means of Laser Diffraction Scattering Particle Size Analyzer (LS230), manufactured by Beckman Coulter, Inc. A crystallite size is a value obtained by a method in which a value of a half width of the peak is determined wherein the peak is ascribed to the (1,1,1) crystal face diffraction as measured by means of an X-ray diffraction apparatus (M18XHF22), manufactured by MAC Science Co., Ltd., under conditions such that the radiation source is CuKα, and the obtained value of the half width is applied to the Scherrer's equation.

Spherical Cu85-Ag alloy powder: Cu:Ag weight ratio (Cu:Ag)=85:15; melting point: 1,010° C.; average particle size: 2.5 μm; purity: 99% or higher Component (B) shown in Table 1 is as follows.

Spherical Sn80-Ag alloy powder: Sn:Ag weight ratio (Sn:Ag)=80:20; melting point: 330° C.; average particle size: 2.5 μm; purity: 99% or higher Spherical Sn35-Ag alloy powder: Sn:Ag weight ratio (Sn:Ag)=35:65; melting point: 590° C.; average particle size: 2.5 μm; purity: 99% or higher Component (C) shown in Table 1 is as follows.

Epoxy resin A: bisphenol A type; number average molecular weight: 1,800

Phenolic resin A: resol type; number average molecular weight: 3,000

According to the composition shown in Table 1, components (A) to (C), a solvent and others were mixed together and kneaded by means of a roll mill until the resultant mixture became uniform, and then a solvent was added to the mixture so that the resultant paste had a viscosity of 40 Pa·s/25° C.

Preparation of Multilayer Ceramic Capacitor Sample

The conductive paste having the composition shown in Table 1 was uniformly applied by dipping to the leading side for internal electrode of a ceramic composite material for chip multilayer capacitor (1608 type; B characteristics; Ni internal electrode; theoretical capacity: 1 μF) so that the paste cured had a thickness of about 50 μm, and dried at 150° C. for 10 minutes, and then cured in air at 300° C. for 30 minutes to form an external electrode. Subsequently, the resultant composite material was plated with Ni in a Watts bath, and then plated with Sn by electroplating to obtain a chip multilayer capacitor.

Measurement

With respect to the above-obtained chip multilayer capacitor device, initial electric properties (electrostatic capacity, tan δ) were measured by 4278A, manufactured by Agilent, and a bonding strength (shear strength) of the external electrode with the substrate was measured by a bench strength tester, manufactured by AIKO ENGINEERING CO., LTD. Then, electric properties and a bonding strength after a heat cycle resistance test {−55° C./125° C. (30 minutes/30 minutes); 250 cycles} were measured similarly. The results are shown in Table 2.

[Table 2]

TABLE 2

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Capacity (μF) | Initial | 1.02 | 0.99 | 1.00 | 1.00 | 0.94 | 1.00 | 1.00 | 0.97 |
|  | After heat cycle | 0.93 | 0.96 | 0.95 | 0.96 | 0.94 | 0.94 | 0.53 | 0.94 |
| tanδ (%) | Initial | 2.9 | 2.8 | 2.9 | 2.9 | 2.9 | 3.4 | 2.9 | 2.8 |
|  | After heat cycle | 2.9 | 2.9 | 3.0 | 2.9 | 3.0 | 6.6 | 77.5 | 17.0 |
| Bonding strength (kN/cm$^2$) | Initial | 1.9 | 1.6 | 1.8 | 2.1 | 1.2 | 1.8 | 1.9 | 1.1 |
|  | After heat cycle | 1.8 | 1.5 | 1.5 | 1.9 | 1.1 | 1.5 | 1.6 | 0.9 |

It is apparent that each of the samples in Examples 1 to 5 exhibits stable electric properties and excellent bonding strength after the heat cycle and hence is excellent as a capacitor. By contrast, in each of Comparative Examples 1 to 3, particularly the properties after the heat cycle are poor.

INDUSTRIAL APPLICABILITY

The thermosetting conductive paste of the present invention does not need calcination at a high temperature, and therefore it is free of problems caused due to the high-temperature calcination in forming an external electrode for multilayer ceramic electronic part, and hence can easily achieve excellent electric properties. Further, the thermosetting conductive paste is very advantageous in that a multilayer ceramic electronic part having an external electrode suitable for mounting on a substrate or plating can be obtained using the paste.

The invention claimed is:

1. A thermosetting conductive paste comprising:
   (A) a metal powder having a melting point of 700° C. or higher;
   (B) a metal powder having a melting point of higher than 400 to lower than 700° C.; and
   (C) a thermosetting resin,
   wherein a weight ratio of component (A):component (B) is 90:10 to 30:70.

2. The thermosetting conductive paste according to claim 1, wherein the component (A) is powder of a metal selected from the group consisting of Ag, Cu, Ni, Pd, Au, Pt and an alloy thereof.

3. The thermosetting conductive paste according to claim 1, wherein the component (A) is Ag fine powder having the following characteristics:
   (a) an average particle size of 50 to 80 nm in respect of primary particles;
   (b) a crystallite size of 20 to 50 nm; and
   (c) a ratio of the average particle size to the crystallite size of 1 to 4.

4. The thermosetting conductive paste according to claim 1, wherein the component (B) is metal powder comprised of an alloy of at least one element selected from Sn, In and Bi and at least one element selected from Ag, Cu, Ni, Zn, Al, Pd, Au and Pt.

5. The thermosetting conductive paste according to claim 1, which is used in forming an external electrode for multilayer ceramic electronic part.

6. A multilayer ceramic part having an external electrode formed using the thermosetting conductive paste according to claim 1.

7. The multilayer ceramic electronic part according to claim 6, wherein the external electrode has an Ni layer formed on the surface thereof and further formed thereon an Sn layer.

8. The multilayer ceramic electronic part according to claim 6, which is a capacitor, a capacitor array, a thermistor, a varistor, or an LC, CR, LR or LCR composite part.

9. A multilayer ceramic electronic part obtained by:
   (1) preparing the thermosetting conductive paste according to claim 1 and a ceramic composite material in which an external electrode is to be formed;
   (2) printing or applying the thermosetting conductive paste onto the leading side for an internal electrode of the ceramic composite material, and optionally drying the paste; and
   (3) keeping the ceramic composite material obtained in the step (2) at 80° C. to 400° C. for 1 minute to 60 minutes to form the external electrode.

10. The thermosetting conductive paste according to claim 1, wherein the component (A) is Ag and the component (B) is Sn—Ag alloy powder.

11. The thermosetting conductive paste according to claim 10, wherein the component (B) is Sn—Ag alloy powder having an Sn:Ag weight ratio of 70:30 to 30:70.

12. The thermosetting conductive paste according to claim 11, wherein the component (C) comprises an epoxy resin and a phenolic resin.

13. The thermosetting conductive paste according to claim 10, wherein the component (C) comprises an epoxy resin and a phenolic resin.

14. The thermosetting conductive paste according to claim 1, wherein the component (C) comprises an epoxy resin and a phenolic resin.

* * * * *